FIG. 1

INVENTOR
WARREN V. WEAVER

INVENTOR.
WARREN V. WEAVER
BY
Wilson & Fraser

United States Patent Office

3,506,095
Patented Apr. 14, 1970

3,506,095
GROUP ELEVATOR CONTROL FOR RESTRICTED POWER CONDITIONS
Warren V. Weaver, Toledo, Ohio, assignor to Reliance Electric Company, Toledo, Ohio, a corporation of Delaware
Filed Nov. 22, 1967, Ser. No. 685,153
Int. Cl. B66b 1/24
U.S. Cl. 187—29        24 Claims

ABSTRACT OF THE DISCLOSURE

A plural car elevator system control for maintaining reduced service by less than all cars when the primary power to the system is cut off and a limited amount of auxiliary power is provided. The control selects individual cars to be started, insures that they are at a parking floor, and then shuts them down. This sequence is followed for each car until all cars but the cars or car to be maintatined in service have been shut down. The car or cars maintained in service can be operated as on a normal up peak program.

---

This invention relates to elevator controls and more particularly to a supervisory control for a group of elevators to maintain restricted service where the main power supply is cut off and where an auxiliary source providing a restricted amount of power sufficient to operate only a portion of the cars of the group is available.

Heretofore it has been known to provide auxiliary sources of power for elevator systems. These sources have been coupled to the system automatically in response to the failure of the primary source. The auxiliary sources, where inadequate to supply the requirements of the entire group of cars have been complemented by controls which automatically select individual cars, cause each selected car to run to a parking floor and shut down and, when only one car remains away from the parking floor, cause the remaining car to operate as a single car system. A later embodiment of this type of system is disclosed in Robertson United States Patent 2,968,364 of Jan. 17, 1961, entitled "Emergency Elevator Circuit" where even the last car is returned to a parking floor before being conditioned for general service to the building.

These prior art systems were arranged to select the cars in a fixed order without regard to their location or operating state. Cars stopped between floors by the failure of the primary power source were required to wait their turn for starting and then were sent directly to a parking floor. This type of operation can be quite disturbing to passengers within those cars. Automatic systems can include an "independent service" mode of operation for cars wherein the car doors are closed only by manual actuation and the cars run independently of the supervisory system for the group. In prior art systems if a car on "independent service" were selected as the car to continue in service when auxiliary power is imposed, the system would lock up without an attendant on the car.

An object of the present invention is to improve the control of a group of elevators.

A second object is to insure that cars on "independent service" at the time the primary source of power for a system fails are located at a parking floor prior to setting those on "group service" in operation.

A third object is to move cars stopped between floors at the time the power failure occurred to an adjacent landing and thereafter to cause them to run to a parking floor.

A fourth object is to insure that a car which is capable of automatic unattended service is selected for service when the other cars of the system are parked under conditions where restricted auxiliary power is supplied following the failure of the primary source of power for a system.

A fifth object is to insure that no passengers are trapped in elevators when the primary power fails and an auxiliary source of power is applied to the system.

A sixth object is to remove a failed car from the sequence of operations of a system operating from a power source having a capacity sufficient to run only a portion of the cars in the system whereby system lockup is avoided and further operations can function.

In accordance with the above objects one feature of this invention resides in a control responsive to the removal of power adequate for full operation of an elevator system automatically to transfer the supervisory controls for the group of cars to a restricted service mode.

Another feature involves a car selection means for selecting cars to be run individually to parking floors which selects cars in an order such that the last cars selected are capable of continued automatic operation within the limits of the power available.

Another feature involves means for selecting cars under emergency power conditions such that cars on "independent service" during a power failure are started prior to cars in "group service."

A fourth feature comprises means for individually selecting cars on "independent service," starting the M-G set of the selected car, opening the doors of that car if it is stopped at a floor, or running the car at slow speed to the next lower floor and then opening its doors, and then shutting down the car M-G set. In one embodiment the car is shut down at the floor at which it is first stopped. In another embodiment the car is run from the floor at which it is stopped to a main floor, advantageously the ground floor or a floor at which the primary building exit is located.

Another feature comprises controls for running cars which have been stopped between floors by a power failure to the closest floor, opening the car doors for a stopping interval and then running the cars to a parking station.

A further feature is the control for avoiding lockup of the system where a car fails to energize its hoist equipment or run such that other cars are properly sequenced and service is provided with the limited power.

While the present disclosure is of a system wherein the auxiliary power is utilized to move but one car at a time, an important feature is the arrangement of operating functions which readily adapts itself to the control of two or more but less than all cars of the system. This feature is particularly desirable where the auxiliary power source has the capacity to operate the two or more cars. Thus the system lends itself to handling two selected cars simultaneously and once the other cars are parked operating two cars as on a restricted "up peak" operating mode. In particular where operation is continued with two cars, the cars can be time dispatched from the lower dispatching terminal and high call reversed to return to that terminal when applied to a conventional time dispatched group supervisory control, for example, as shown in Raymond A Burgy United States patent application Ser. No. 808,290 of Mar. 30, 1959, now Patent No. 3,353,631 for "Elevator Dispatch Control Using Integrated Stop Time as a Measure of Traffic." When applied to a system of the type shown in United States patent applications Ser. No. 493,973, now Patent No. 3,443,668 entitled "Plural Car Elevator System for Developing Hall Call Assignments Between Individual Cars and Registered Hall Calls" and 494,194 entitled "Elevator Controls," both filed Oct. 8, 1965 respectively by D. L. Hall and W. C. Susor and by D. L. Hall, W. C. Susor and J. H. Kuzara, the supervisory functions of call selection and allotment to the operating cars continue under the operation of the restricted number of cars.

The above and additional objects and features of this invention will be more fully appreciated from the following detailed description of an illustrative embodiment when read with reference to the accompanying drawings wherein.

Figure 3:
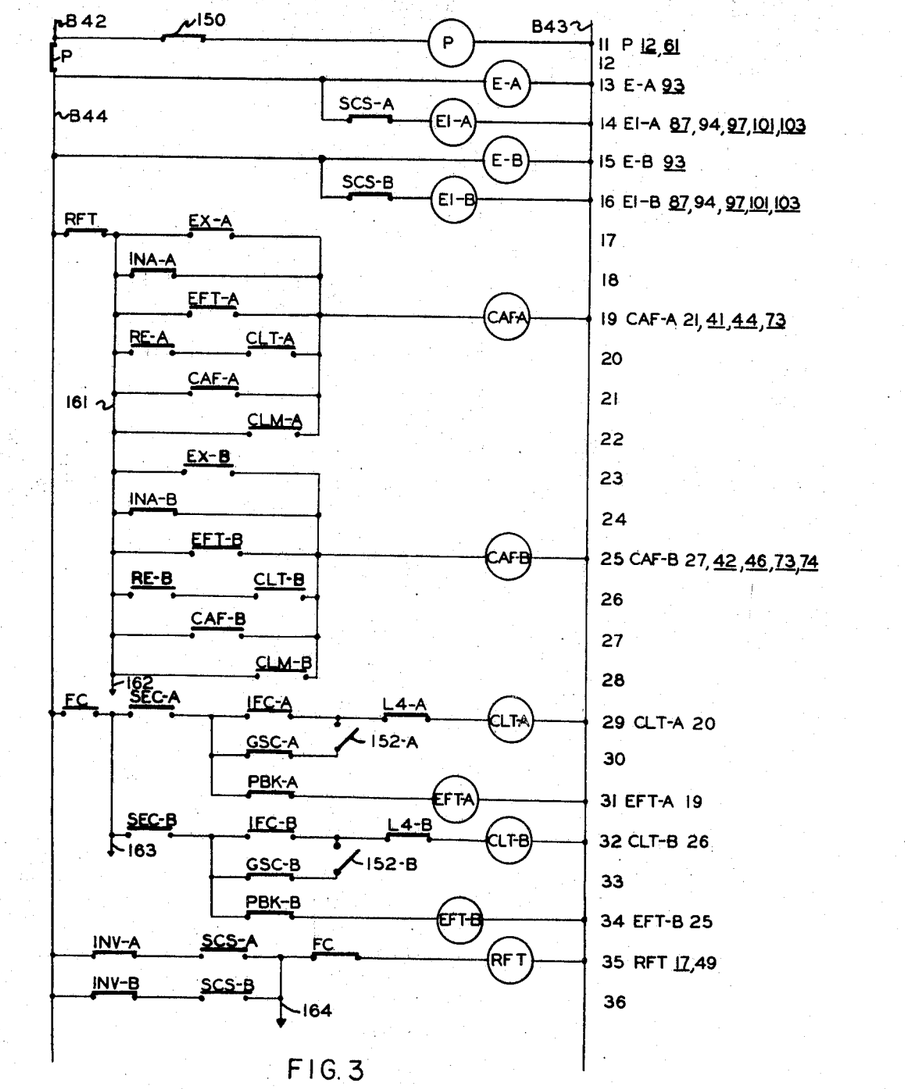
FIG. 3 is an across-the-line diagram of portions of the emergency power control for typical cars of a group which are supplied by alternating current in the example.
Figure 4:
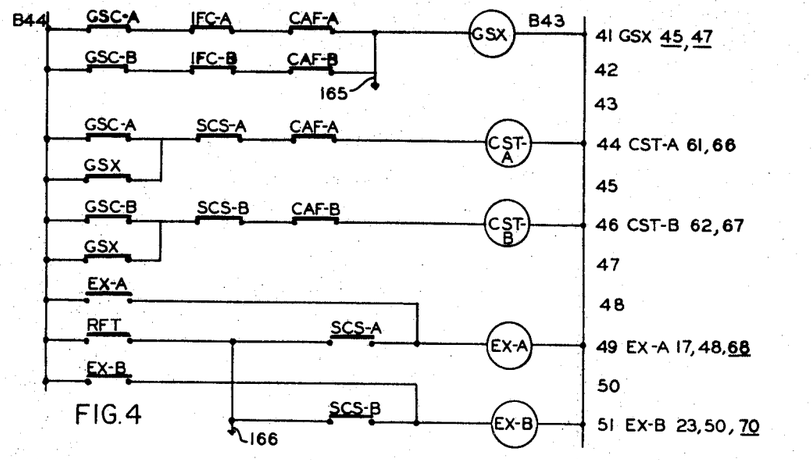
FIG. 4 is an across-the-line diagram which is a continuation of the circuits of FIG. 3.
Figure 5:
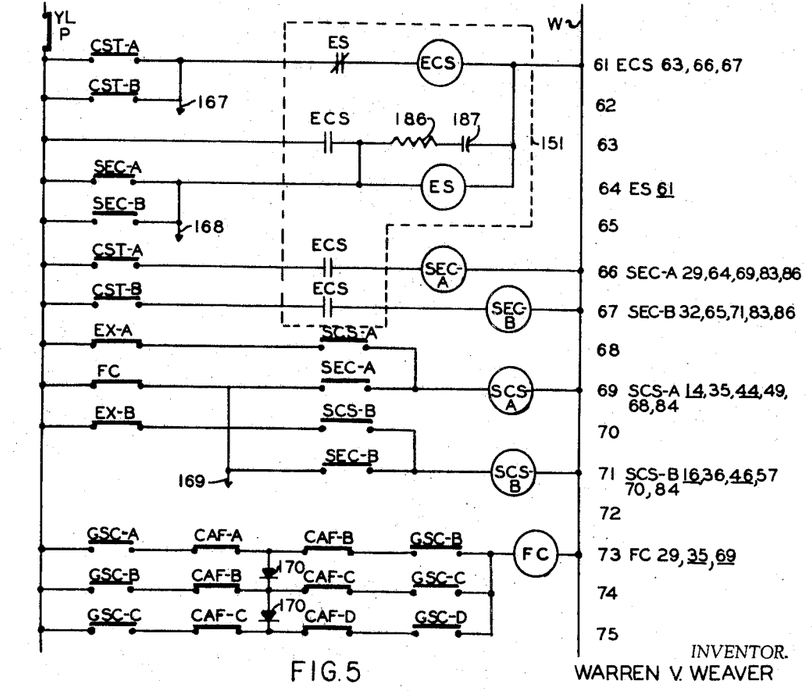
FIG. 5 is an across-the-line diagram of the selection circuits of the emergency power control including elements individual to typical cars and those common to all cars of the system.

The present invention is disclosed in fragmentary form to reduce the extent of the specifications and drawings. For illustrative purposes the power failure equipment and controls of the invention can be applied basically to an elevator system of four cars serving a main floor at the lowest or first floor and nine floors above the main floor. The system is controlled basically by a dispatching and programming supervisory control as shown in United States patent application Ser. No. 808,290 filed Mar. 30, 1959, now Patent No. 3,353,631, in the name of Raymond A. Burgy and entitled "Elevator Dispatch Control Using Integrated Stop Time as a Measure of Traffic." The supervisory control aspects of the system of the Burgy application can be modified further by the superposition of the car zoning arrangement disclosed in United States patent application Ser. No. 565,551 filed July 15, 1966 for "Elevator Control" in the name of Paul F. De Lamater particularly with regard to the means of sensing the spatial relationships between cars and calls to be served by those cars and the direction for the cars. In addition the car controls for the hoist motor are modified from those of the above noted Burgy application to utilize the system of United States patent application Ser. No. 343,301 filed Feb. 7, 1964, now Patent No. 3,410,367, for "Elevator Motor Acceleration Control by a Stepped Resistor Responsive to Distance From Floor" in the names of Robert O. Bradley and Paul F. De Lamater. In view of this basic for the system the disclosure of the aforenoted applications is incorporated herein by reference and it is to be understood that the disclosed controls in the case of FIGS. 3, 4 and 5 are superimposed upon the system made of the composite of the Burgy, De Lamater and Bradley et al. disclosures while FIGS. 6 and 7 can be considered modifications of the composite and particularly of those portions found in the De Lamater and Bradley et al. disclosures.

In order to facilitate an understanding of the features of this invention, it has been presented in across the line form wherein contacts of relays and switches are not physically coupled to the actuating coils or motors thereof. Each coil or motor is shown as a circle with reference characters and with the contacts in its energizing circuit. The drawings can be considered as made up of numbered horizontal bands or zones. A marginal index to the right of the circuits contains the zone numbers. Each reference character of a coil or motor is noted in the marginal index in horizontal alignment with the coil or motor as represented in the circuit. Adjacent the right hand margin is a list of zone or line numbers, one for each contact controlled by the motor or coil with which it is aligned. Back contacts, those which are closed when the armature is released and are opened when the armature is pulled in are underlined in the margin index to distinguish them from front contacts which are identified by number alone. Where a relay or contact is individual to a car and duplicated in the drawings for other cars, it is identified by the reference character and a letter suffix of the car's designation spaced therefrom by a dash. Thus, in the case of the car failure relay for car A, relay EX–A having a coil at 49 of FIG. 5, the marginal index indicates front contacts of that relay at lines 17 and 48 and a back contact at line 68.

In order to further aid in understanding this invention, lists of the relays and switches are presented in alphabetical order of their reference characters with the functional titles for those relays and switches and where shown the location in the drawings of the coils. The lists have been grouped as those having coils shown and those with no coils shown. They follow:

Relays and switches individual to the cars

| | |
|---|---|
| BP (By Pass) | 103 |
| CAF (Car At Floor) | 19, 25 |
| CLT (Car Leveling Timer) | 29, 32 |
| CS (Car Start and Run) | 95 |
| CST (Car Selection Control) | 44, 46 |
| D (Down Direction Start) | 114 |
| DL (Down Direction Locking) | 118 |
| E (Emergency) | 13, 15 |
| EFT (Emergency Failure Timer) | 31, 34 |
| EX (Car Failure) | 49, 51 |
| E1 (Auxiliary Emergency) | 14, 16 |
| GSC (Group Service) | 104 |
| LBP (Load By Pass) | 107 |
| LR (M-G Set Run) | 82 |
| LS (M-G Set Starting Switch) | 85 |
| LSA (M-G Set Start-Run) | 84 |
| LST (Starting Switch Timer) | 88 |
| LW (Load Weighing) | 105 |
| MGF (Intermediate Floor Stopping) | 97 |
| PF (Power Failure) | 87 |
| RE (M-G Set Start) | 81 |
| SCS (Service Car) | 69, 71 |
| SEC (Selected Emergency Power Car) | 66, 67 |
| U (Up Direction Start) | 111 |
| UL (Up Direction Locking) | 115 |
| ULA (Up Direction Locking) | 119 |
| VR (Vernier Start and Run) | 93 |

Relays and switches common to the cars

| | |
|---|---|
| ECS (Emergency Car Selection) | 61 |
| ES (Emergency Car Selection Control) | 64 |
| FC (Final Car) | 73 |
| GSX (Common Group Service) | 41 |
| P (Potential) | 11 |
| RFT (Recycle Failure Timer) | 35 |

Contacts of relays and switches individual to each car for which no coils are shown ACC (Car Acceleration)
ADT (At Dispatch Terminal)
AIN (Attendant-Independent)
AMFC (Above Main Floor Control)
AMR (Advance Motion)
CC (Car Call)
CLM (Manual Shut-Down)
CLS (Door Close Control)
DCL (Door Close Limit)
DF (Down Generator Field)
DRC (Direction Reversal Control)

EM (Emergency Stop)
FT (Failure Timer)
HS (Hall Call Stop)
IN (Inspection)
INA (Inspection)
INV (Vernier-Inspection Normal)
LR1 (Emergency-Normal)
L4 (4 inch Leveling Zone)
MG (Main Dispatch Floor)
MGT (M-G Set Timer)
NAC (Uon-Assigned Car)
OL (Generator Overload)
OPS (Door Open Control)
PBK (Partial Brake)
RH5 (Fifth Rheostat Position)
RP (Reverse Phase)
SBF (Stop Between Floors)
TR (Short Standing Time)
TRL (Long Standing Time)
UDD (Up-Down Dispatch)
UDX (Car Running)
UF (Up Generator Field)
1FC (Main Floor)

Contacts of relay common to the cars for which no coil is shown

CPFA (Common Power Failure Auxiliary)
FTD1 (Dispatch Failure Timer)
SS (Landing Coil Indication)

Figure 1:
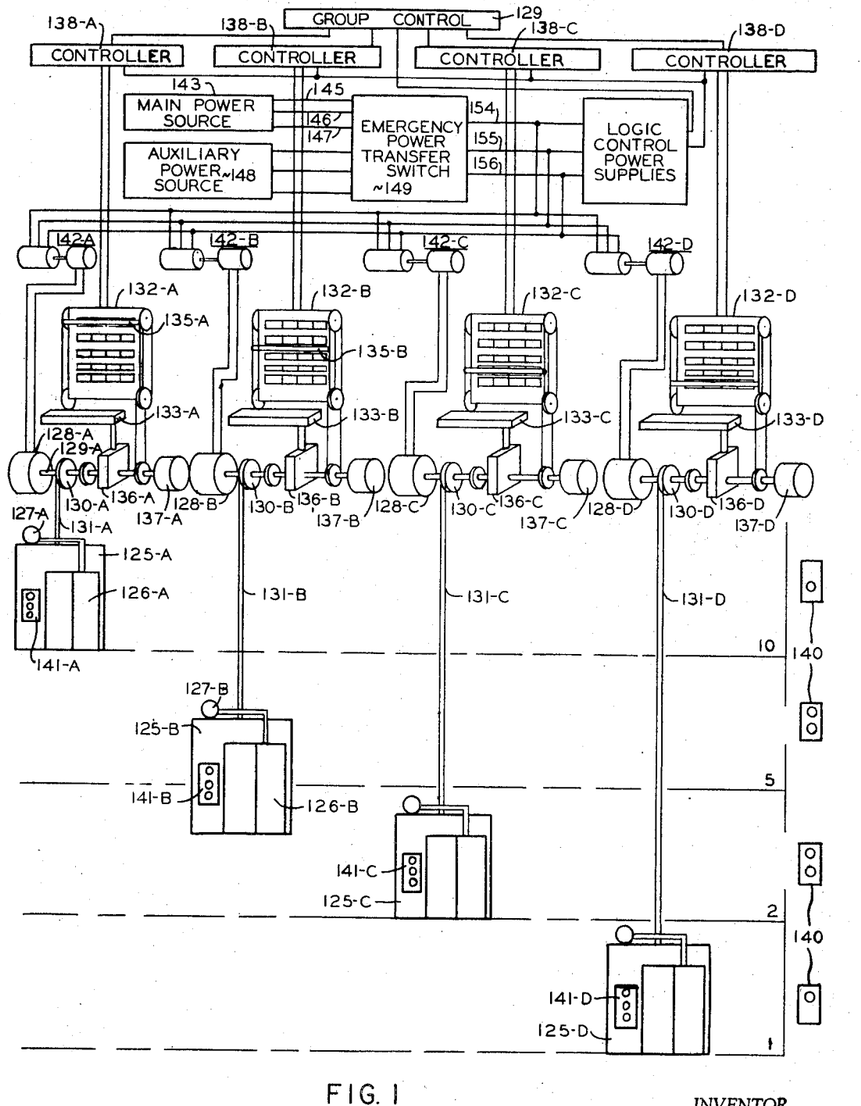
FIG. 1 schematically represents the combination of a group of four elevator cars serving a plurality of floors and coordinated in their operation by a group of supervisory control, to which combination the present invention is applicable.
Figure 2:
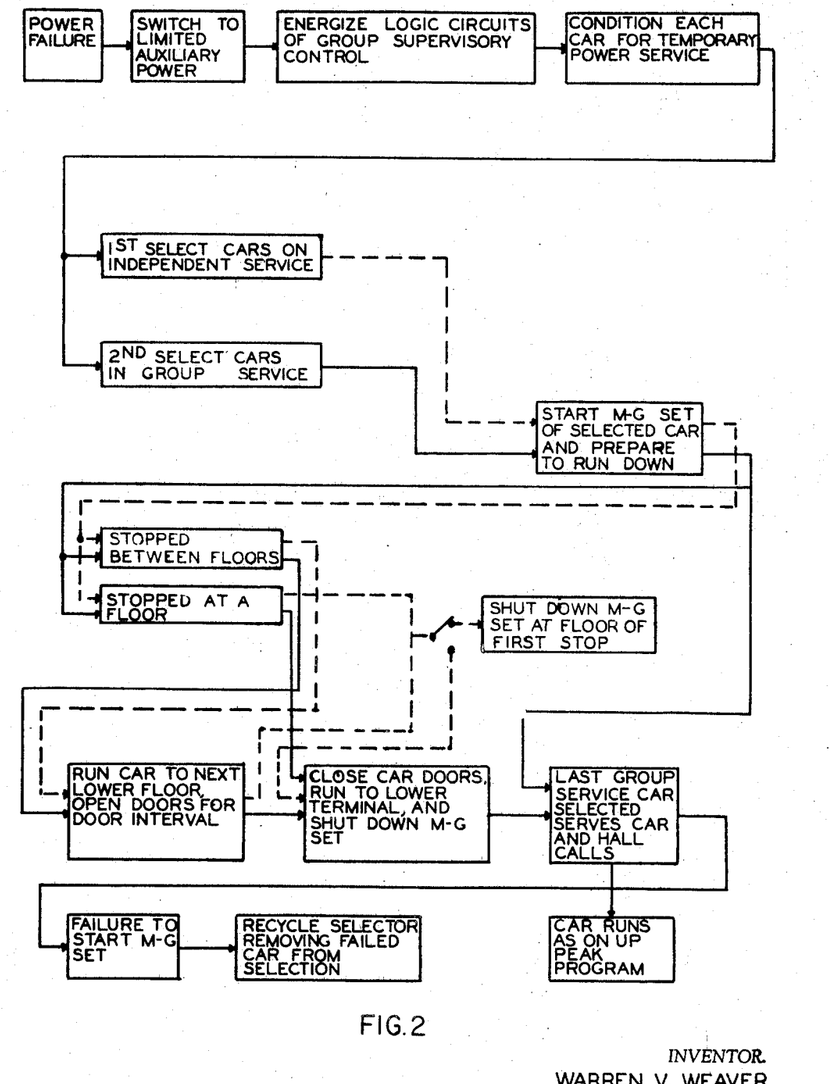
FIG. 2 is a functional block diagram of the present emergency power control for elevator systems of the type shown in FIG. 1.

A typical elevator system of four cars serving ten floors has been chosen for illustrating this invention. As shown in FIG. 1 each car 125 is provided with a closure 126 of one or more doors and a door operating mechanism 127 including a motor, timers for measuring the interval the doors are open, limit switches responsive to the door position, and safety mechanisms. A hoist motor 128, usually energized by a motor-generator set 142 is coupled to each car by means of a shaft 129 upon which is mounted a hoist cable sheave 130 for cables 131. A floor selector 132 with associated motor controls is coupled to the car to control hoist motor speed through some mechanism such as a cam operated rheostat 133 in conjunction with leveling switches (not shown) which precisely indicate car position when the car is adjacent the floors and operating at slow speeds. The floor selector coordinates control operation with car position by an array of contacts in rows representing circuits effective while the car is at or approaching a floor and in columns for similar functions at different floors. A crosshead 135 carries a generally horizontal group of brushes which commutate the floor selector contact array as the car travels by generally following the motion of the car on a scale proportioned to the array.

The rheostat 133 and crosshead 135 are driven in the example by gearing and a differential 136 from the hoist motor 128 or an advance motor 137 and the hoist motor 128 as disclosed in the aforementioned Bradley et al. application. Thus the crosshead moves in advance of the car to pick up stopping signals and the differential is responsive to the position of the car as it is driven along the hatchway.

Each car has a group of controls individual to it and generally represented by the block 138 designated "controller." Operation of the cars as a coordinated group is by a "group control" represented by block 139 coupled to each controller 138.

Service requirements are registered at the several floors by hall call buttons 140 conveniently located with respect to the car entrances. Each floor except those at the limits of car travel is provided with an up and a down hall call switch while the uppermost floor has only a down hall call switch and the lowermost floor has only an up hall call switch. Car occupants register their service requirements on car buttons for the several floors. These buttons are located on a panel 141 which can include a door close button for closing the car doors when it is asigned to "independent service."

An appreciation of the invention will be facilitated from a consideration of the system in normal operation with all cars in service and distributed throughout the building with power supplied to each hoist motor 128 from individual motor-generator sets 142 supplied from a primary power source 143 having buses 145, 146, and 147 for a three phase A.C. source. As will be discussed, conventional start and run controls couple the induction motor drive of each motor-generator set 142 to power source 143. The system includes an auxiliary power source 148 which is connectable to supply three phase A.C. power at a level sufficient to run less than all the cars. In the example it will be assumed source 148 provides adequate power for one car to operate.

When source 143 fails the cars 125-A through 125-D stop at random locations throughout the building. Four conditions are possible. A car in service can be operating either automatically in the "group service" mode or it can be operating in the "independent service" mode. In either mode the car can be at a floor with its doors open or it can be closed. If it is closed it can be at a floor or between floors. In the present example, restoration of a restricted amount of power as from auxiliary source 148 following a failure of source 143 causes a transfer of the bus connection from the main source 143 to the auxiliary source 148 through an emergency power transfer switch 149 which also applies emergency power to the logic circuits (shown only fragmentarily) of the elevator system. Transfer switch 149 also opens a back contact 150 at line 11 of FIG. 3 to disable potential relay P and condition the system for emergency power operation.

When the alternate source of power is connected following a main power failure the system initially treats any cars on "independent service" and then processes the cars on "group service." "Group service" cars are isolated from a selector 151 while any "independent service" cars are to be processed and the selector select each "independent service" car if stopped between floors has its M-G set 142 started, is set for down travel, runs to the next lower floor at a low speed (e.g. inspection speed), levels into the floor and opens its doors. "Independent service" cars stopped at a floor, when selected, have their M-G sets started, and open their doors if they are closed.

An "independent service" car is parked and shut down in either of two sequences once it is positioned at a floor with its M-G set in operation. In the first sequence switches 152 at 30 and 33 are closed and switches 153 at 95 are open for the cars to cause the cars to stand at the floor for an interval, e.g. 10 seconds, and then shut-down their M-G sets and relinguish their selected status. If switches 152 and 153 are respectively closed and opened the cars run from the floor at which they are initially stopped and opened to the main floor by closing their doors after a suitable door open interval, running downward at normal speeds, stopping at the main floor, opening their doors at the main floor, and after a suitable interval at the main floor, e.g. 10 seconds, they shut down their M-G sets and relinguish their selected status.

After all "independent service" cars have been selected and shut down at a parking floor the "group service" cars are selected individually and sequenced according to the second alternative sequence for the "independent service" cars for all cars but those to be retained for service during the operation under emergency power.

In the present example, where only one car is retained in service following the clearance of all other cars, when only one car remains in the unparked state, it is conditioned to provide regular service by responding to hall and car calls. Advantageously it can be set to be time dispatched from the lower terminal and high call reversed.

If any selected car in any of the above assumed conditions fails to respond to selection by failing to start its M–G set for a predetermined time interval, it is released from the selection sequence and the selector is advanced to the next car in the sequence. If the failed car is the last car selected the selection cycle is repeated and the last car, excluding the car which failed to start, is selected for regular service. In this manner limited regular service is assured and a system lockup is avoided.

The details of the circuits and operations affording the above operations will now be undertaken with reference to FIGS. 3 through 6.

DESCRIPTION OF FIGS. 3 AND 4

While normal power is maintained on the system the emergency power transfer switch 149 couples source 143 to buses 154, 155 and 156 as shown in FIG. 1 and its contact 150 as shown in FIG. 3 at line 11 so that potential relay P is energized. With relay P energized the emergency power controls are ineffective since back contacts P at 12 of FIG. 3 and 61 of FIG. 5 are open. Relay P can also be utilized to modify the programming of the group supervisory control if this is desired; for example it can open circuits which permit zoning under normal operations (by means not shown).

Upon loss of main power for an interval in excess of the drop out interval of slow-to-release relay P, e.g. ½ second, relay P drops. Note that momentary interruptions of the normal supply have no effect on relay P if the supply 143 is restored within ½ second. When the auxiliary power is available emergency power transfer switch 149 is actuated, by means not shown, to couple source 148 to buses 154, 155 and 156 of FIG. 1 whereby power is applied from the auxiliary source 148 to the group control 139, to the controller circuits 138 of each car and to the motor generator set input terminals for each car.

Application of power from the auxiliary source 148 to leads B42 and B43 of FIG. 3 has no effect on relay P since contact 150 remains open. Closed back contact P at 12 to lead B44 energizes the remainder of the A.C. supplied circuits for the several cars. Emergency relay E for each car picks up as E–A at 13 and E–B at 15 for cars A and B. Emergency relay E1 for each car also picks up at this time since no car is selected as service car and all SCS relays are dropped to close their back contacts as at 14 and 16. The emergency relays E and E1 alter the circuits individual to the respective cars to condition those cars for service in the auxiliary power mode. Relay E1 is dropped to permit a car to provide general service after the other cars not on general service have been shut down.

Back contact E1 at 87 for each car opens to block the circuit for power failure relay PF whereby the starting of the car's M–G set is restricted to the emergency power sequence through each car's selected emergency power relay SEC. Back contact E at 93 for each car opens to restrict the car's starting functions to control through the emergency power sequences. Contact E1 at 94 closes to enable the emergency power sequences for each car's start controls. Back contact E1 at 103 opens to disable each car's bypass relay circuits thereby rendering the car non-responsive to hall calls and eliminating certain operating modes of the type disclosed in P. F. De Lamater United States patent application Ser. No. 565,551 filed July 15, 1966, entitled "Elevator Control." Car calls are rendered ineffective for each car by the opening of back contact E1 at 101. Since the dispatching and program controls are energized under emergency power operation and since certain of those controls are influenced by the integrated stopping time of the cars to alter both dispatch time intervals and operating programs, as disclosed in R. A. Burgy United States patent application Ser. No. 808,290 filed Mar. 30, 1959, now Patent No. 3,353,631 for "Elevator Dispatch Control Using Integrated Stop Time as a Measure of Traffic," each car's intermediate floor stopping relay MGF is disabled by the opening of back contact E1 at 97.

After all cars which are to be shut down in the emergency power mode have been shut down, relay E1 for the car or cars to remain in general service is dropped whereby the car serves car and hall calls and its response is effective, through relay MGF, in the group supervisory control functions.

Relay CAF for each car is energized when the car is at a floor at which it is shut down. Timer CLT for each car times an interval the car is within the final leveling zone to either define an interval during which the car's M–G set is maintained energized. Emergency failure timer EFT is effective where a selected car fails to run to permit other cars to be sequenced after a starting interval for a failed car has expired. Recycle timer RFT operates if a car is not available for general service when all other cars have been parked and shut down. Group service relay GSX at 41 is common to all cars and is energized to enter into operation of car selection control relay CST for each car when any car is not in group service and has not been shut down and thus is on "independent service" away from the main parking floor whereby such cars are selected prior to "group service" cars. Relay CST indicates a car available for selection to the car selection controls of FIG. 5. Failure of a service car, one for general service, to start its M–G set energizes car failure relay EX to hold the car out of the selection sequences and to initiate a recycle of those sequences.

Car at floor relays CAF at 19 and 25 pick up when the respective car is stopped at a floor at which it is to be shut down. Back contact RFT at 17 is normally closed so that lead B44 is connected to lead 161 to enable the CAF circuits for each of the cars in the system. Contact EX at 17 is closed only if car A is the only car remaining to be sent to the parking floor and shut down, has been selected as the service car and has failed to run. Under these circumstances contacts RFT and SCS–A at 49 have closed to energize relay EX–A which retains itself sealed throughout the remainder of the emergency power operation by seal contact EX–A at 48. When the car selection process selects another car following such a failure and contact RFT at 17 closes, relay CAF pulls in and seals itself at 21 to effectively eliminate the failed car from subsequent selection cycles by opening its circuit for group service relay GSX at 41 and for car selection control relay CST at line 44.

If a car is on inspection, relay CAF is energized through an inspection relay contact such as INA–A for car A at 18 to prevent its selection for emergency power service.

An emergency failure of a car to energize relay EFT as at 31 for car A energizes relay CAF at line 19 for car A.

When a car has its M–G set running to close its contact RE as at 20 for car A and is in its final leveling zone to close its CLT contact at 20 for car A, relay CAF is energized.

If the car has been manually shut down to energize relay CLM (not shown), its CLM contact as at 22 for car A is closed to energize CAF. Relay CLM is energized when a car at the main floor is manually switched out of service.

The car leveling timer CLT and emergency failure timer EFT for each car are dependent upon the final car relay FC at 73 being energized. This condition prevails while a car remains to be shut down. In the example where one car remains on general service after all others are shut down relay FC is energized so long as at least two cars are in group service and have their car at floor relays CAF dropped. Thus all but the last car selected is subject to relays CLT and EFT. These relays are further confined to operation only when their respective car has been selected and its selected emergency power relay SEC is energized as at 66 for car A to close contact SEC–A at 29. Timer CLT defines the interval a car remains in the low speed leveling zone of the floor at which it is to be shut down as a selected emergency power car.

In the case of a car on "independent service" relay CLT is effective through back contact GSC of the car's group service relay as at 30 for car A. Thus CLT is enabled when the car is leveling at the first floor it encounters. If "independent service" cars are to be sent to the main floor, switches 152 as at 30 and 33 are opened to restrict operation of CLT to the leveling zone of the main floor through closed contact 1FC. When the car is in group service, its GSC back contact is open and the energizing path for relay CLT is enabled only when it approaches the parking floor, the first floor in the example, to close main floor relay contact 1FC as at 29 for car A. The relay is deenergized when the car is outside the low speed leveling zone and is energized to initiate its timing interval, e.g. a pull-in interval of ten seconds, when the car is four inches from level to drop fourth leveling relay L4 and close its back contact as at 29 for car A. Relay CLT energizes relay CAF when the car has been in the leveling zone the allotted interval.

Emergency failure timer provides an adequate interval to run the car under emergency power conditions for any state in which the car may be, e.g. one minute. It is energized for the selected car through back contact PBK of partial brake relay PBK (not shown) which closes its contact a brief time interval after the generator field relay is energized as the car is started. Thus, on initial selection of the car through SEC relay EFT is energized. However, the car should start and the timer reset before EFT times out. If the car does not start and EFT times out, it releases the car from the selection sequence by energizing relay CAF as through the closure of contact EFT-A at 19 for car A.

Recycle failure timer RFT at 35 causes the emergency power service selection sequence to recycle where the car selected for general service is incapable of running. The service car is selected through its SCS contact as at 35 for car A and if it cannot run its vernier-inspection relay INV is dropped to close back contact INV-A at 35 for car A. The final car status is indicated by closed back contact FC at 35.

When RFT is energized for its required interval, three minutes in the example, it removes the failed car from further emergency power operations by energizing car failure relay EX as at 49 for car A, and it releases all of the car at floor relays for the previously cycled cars by opening back contact RFT at 17 so that they can be recycled.

Group service relay GSX is energized when there is one or more "independent service" cars. Cars not on group service have their group service relay back contact GSC as at 41 for car A closed. Independent service cars at the main or parking floor are not effective to operate GSX since they open their back contact 1FC. After a car has been shut down, its car at floor relay CAF is energized to open back contact CAF at 41 to no longer affect relay GSX. Relay GSX partially enables the car selection control relay circuits for all cars when only "group service" cars remain to be advanced through the emergency power sequence and thus disables the CST circuits for all but "independent service" cars until all such cars have been shut down.

Car selection control relays CST for each car as at 44 for car A enable the stepping coil of emergency car selection switch ECS at 61 and the respective selected emergency power car relay SEC at 66 and 67 for each car which remains to be selected. Cars to be selected when in "independent service" have their back contact GSC as at 44 for car A closed while relay GSX is energized. When all "independent service" cars have been sequenced, relay GSX is dropped to close its back contacts as at 45 for car A. If the car is not the current service car, its back contact SCS of the service car relay SCS is closed as at 44 for car A. All cars which have their car at floor relays deenergized will have their CAF back contacts closed. Thus if a car is on independent service, not the service car, and not at the parking floor, its car selection control relay will be energized from lead B44 through contacts GSC, SCS and CAF to lead B43. If it is in group service and no independent service cars remain it will be energized thorugh contacts GSX, SCS and CAF.

Car failure relays EX as at 49 for car A are energized through the operation of recycle failure timer to remove the final car from emergency power service throughout the period such service is continued. The closure of contact RFT at 49 in conjunction with the closure of contact SCS for the selected service car energizes relay EX. Relay EX seals itself as at contact EX-A at 48 for the remainder of the interval contact P at 13 remains closed and emergency power is imposed.

It is to be noted that certain of the controls shown in FIGS. 3, 4 and 5 are connected in parallel for the individual cars. These circuits are illustrated only for cars A and B. Where additional circuits of the same form are provided for cars C and D those circuits are indicated by arrow-headed leads. Thus lead 162 couples CAF relays for C and D, lead 163 is for CLT and EFT relays for C and D, lead 164 is for selected car and failed car circuits to RFT for cars C and D, lead 165 is for "independent service" circuits for cars C and D to GSX, lead 166 is for EX relays for C and D, lead 167 is for car selection control contacts for C and D, lead 168 is for selected emergency car circuits for C and D, and lead 169 is for service car relays for C and D.

DESCRIPTION OF FIGURE 5

The circuits of FIG. 5 are energized across leads YL and W from a source of rectified 120 volt D.C. (not shown) in the logic control power supply which is coupled to the auxiliary power source with the other logic circuits of the system by the emergency power transfer switch.

Emergency car selection switch ECS as 61 is a stepping switch having at least the number of individually closed contacts, as exemplified at lines 66 and 67, as there are cars to be considered in the emergency power operating sequence. It includes a control relay ES and is arranged in conventional form to be cocked for advancement on energization of coil ECS; to energize coil ES at contact ECS at 63; to advance on deenergization of coil ECS by energization of coil ES and the opening of back contact ES at 61; and to be latched when a car is selected. Selection of a car closes its SEC contact as at 64 for car A to hold ES energized such that its deenergization of coil ECS and the opening of contacts ECS at 63 has no effect on the dropout of ES. On each advance of stepper ECS the previously closed ECS contact is opened and the next succeeding ECS contact is closed. A coincidence in closure of an ECS contact for a car having its car selection control relay CST energized energizes the selected emergency power car relay SEC for that car, as from lead YL through contacts CST-A and ECS at 66 to coil SEC-A and lead W for car A.

When selected emergency power car relay SEC for a car is energized, the stepper is latched by energizing coil ES as through contact SEC-A at 64 for car A. This relay partially enables the car leveling timer CLT and emergency failure timer relays as at 29 for car A. It also partially enables the car's service car relay SCS as at 69 for car A, so that the final car in the sequence as indicated by closed back contact FC at 69 is designated the service car. Relay SEC institutes the start of the selected car's M-G set by enabling power failure relay PF by contact SEC at 86 and through the closure of contact SEC at 83 enabling M-G set start relay RE at 81, M-G set starting switch LS at 85, M-G set start run relay LSA at 84, and M-G set run switch LR at 82.

The service car relays SCS, as at 69 for car A, are enabled as the final car relay FC at 73 drops in response to the energization of the car at floor relay CAF for next to the final car. With back contact FC closed at 69, the operation of the car's selected emergency power car relay SEC to close its contact as at 69 for car A, energizes relay SCS-A indicates that the car will be sustained for continued service under the emergency power operation. If the car does not fail, its back contacts EX of car failure relay EX at line 68 for car A provide a seal through contacts SCS-A at 68 whereby the relay is held until normal power is restored. SCS enables circuits for recycle failure timer RFT by closing contacts SCS at 35 in the event the car fails to run. SCS releases the car selection control relay CST at 44 by opening back contact SCS at 44. The car failure relay EX at 49 is enabled by contact SCS at 49. SCS holds the M-G set start and run relays RE, LS, LSA and LR at 81 to 85 by contact SCS at 84 to enable continuous operation of the car after the drop of relay CST drops the selected emergency power car relay SEC at 66. Relay PF is enabled at this time through back contact E1 which is closed when back contact SCS at 14 opens.

Final car relay FC at 73 is energized during emergency power operation when two or more cars in group service remain to be parked and thus have their CAF relays deenergized. This relay is energized through a matrix of pair of group service relay contacts GSC and car at floor relay back contacts CAF for each car polarized in accordance with the hunting sequence of rotary selector ESC by rectifiers 170. Selection is in the order A, B, C and D. Thus if car B is in group service to close contact GSC-B at 74 and its back contact CAF-B at 74 is closed then relay FC will be energized if either of cars C or D have their CAF and GSC contacts closed at 74 or 75 respectively.

Figure 6:
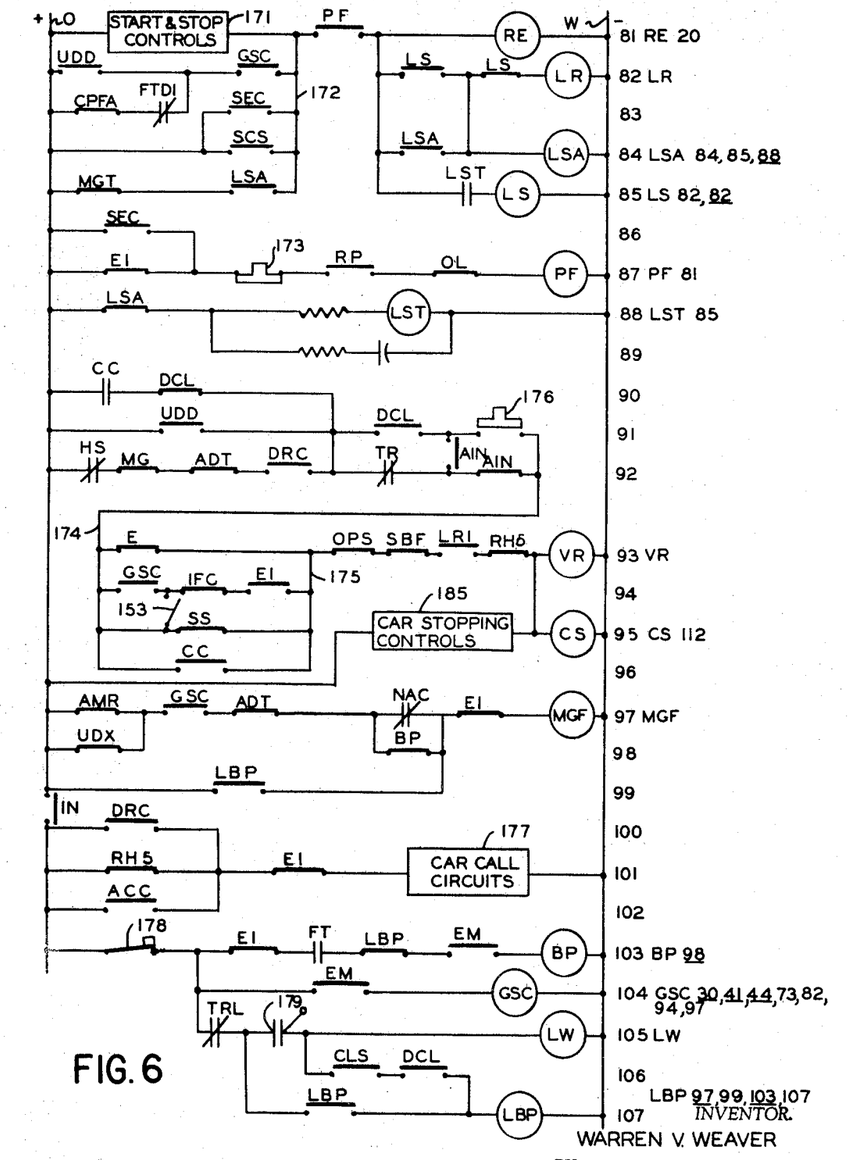
FIG. 6 is an across the line diagram of fragments of the M-G set starting and stopping controls for a typical car and the car running controls for a typical car as they are modified for emergency power operation.

DESCRIPTION OF FIGURE 6

FIG. 6 depicts in fragmentary form certain circuits for a typical car which are modified for the emergency power operation.

Each car has circuits as represented between leads O and W and supplied by a rectified 120 v. D.C. source (not shown) from the logic control power supply.

M-G set start relay RE is energized in the initial sequences of starting a car. The normal operating controls for this relay and its associated starting and run relays LS, LSA and LR are represented by the rectangle 171 labeled "start and stop controls." A circuit must be completed between lead O and lead 172 to run a car's M-G set. This circuit has a number of paths within rectangle 171. In addition a dispatch selection process (by means not shown) can be utilized to start a car's M-G set from a dispatch signal for the car which energizes up-down dispatch relay UDD to close its contacts at 82. If the car is in group service so that contacts GSC are closed at 82 the circuit is completed to 172. Another technique of starting a group service car is by energization of common power failure relay CPFA (not shown) to close contact CPFA at 83 provided further that a dispatch failure condition has not prevailed for more than a predetermined time, e.g. one minute to open back contact FTD1 at 83. A dispatch failure (sensed through means not shown) or the failure of power to a car in group service having its RE relay deenergized and being spaced from the main floor will deenergize common power failure relay CPFA to close contact CPFA at 83. The start of the M-G set by the emergency power sequences through contact SEC at 83 for causing a car to run to a parking floor and through contact SCS at 84 when it is the service car has been discussed with respect to FIG. 5. When the car has been dormant for a suitable interval, the M-G set shutdown timer opens its back contacts MGT at 85 to shut down the set by dropping relays RE, LS, LSA and LR.

Power failure relay PF at 87 is ordinarily energized for each car. Under the emergency power operating mode it is selectively energized since back contact E1 at 87 of the car's emergency relay is open and the car must be selected for emergency power operation by its relay SEC to close contact SEC at 86. Button actuated switch 163 is provided to manually stop the M-G set. Reverse phase relay contacts RP and overload relay contacts OL at 87 are for conventional safety purposes.

With a car's power failure relay PF energized to close contact PF at 81 and a circuit completed by one of the starting controls between leads O and 172, M-G set start relay RE at 81 is energized to start the car's auxiliaries such as lights and ventilators (not shown), to disable the common power failure relay circuit provided by that car to relay CPFA (not shown), and to close contact RE as at 20 for car A in the car at floor relay circuit.

Application of power between leads O and W picks up starting switch timer LST at 29 through back contact LSA. Contact LST at 85 closes to energize M-G set starting switch LS at 85 when the M-G set start circuit is completed. Back contact LS at 82 opens to prevent energization of M-G set run relay LR and contact LS at 82 closes to energize M-G set start run relay LSA at 84. Contacts (not shown) of switch LS connect the motor of the M-G set in a Y connection. Relay LSA closes its contacts at 84 to provide a seal and opens its back contact at 88 to initiate the timed dropout of starting swich timer LST. The dropout interval of LST is selected to be sufficient to permit the build up of the set motor to a speed at which it can be transferred to a delta connection. This is accomplished by dropping relay LS at 85 to close back contact LS at 82 and energize relay LR. Relay LR reconnects the motor in delta and enables the normal set operations to prepare circuits for the generator field relays (not shown), brake and main switch relays (not shown) and the emergency-normal relay LR1 (not shown).

Vernier start and run relay VR at 93 and car start and run relay CS at 95 are energized to start the car and are deenergized through "car stopping controls" to initiate a stop of the car. Conventional car start circuits for relays VR and CS are shown between lead O and lead 174 and between lead 175 and lead W. Thus with the door of the car closed to deenergize door close limit relay DCL (not shown) back contact DCL at 90 is closed and any car call registered in the car will energize car call relay CC (not shown) to close its contacts at 90. A circuit will be available to lead 174 through short standing time relay (not shown) back contact TR at 92 and attendant-independent relay back contact AIN at 92. A dispatch signal to the car closes contacts UDD at 91 of up-down dispatch relay UDD (not shown) to complete with back contacts TR and AIN the circuit to lead 174. A parked car at other than a dispatch terminal one with main landing rely MG (not shown) deenergized to close back contact MG at 92 and at dispatch terminal relay ADT (not shown) deenergized to close back contact ADT at 92, is started by closure of direction reversal control relay contact DRC at 92 if no hall call is registered for the landing at which it is parked so that back contact HS at 92 of hall call stop relay HS (not shown) is closed. On automatic operation back contact TR at 92 closes an interval following the stop of the car or the completion of a load transfer. On independent operation the car is started manually by closure of manual switch 176 in the car control panel around the open back contact AIN at 92. Such manual button is effective as the door is initially opened and until it is nearly closed since contact DCL at 91 is closed during this interval.

Other prerequisites to normal car starting are the absence of a power failure and auxiliary power restoration so that deenergized emergency relay E closes its back contact E at 93. In the case of a car which is subject to the emergency power operating mode, emergency relay back contact E at 93 is opened and auxiliary emergency relay contact E1 at 94 is closed for the selected emergency power car to start that car, provided it is in group service (contact GSC at 94 closed) and provided it is not at the first floor (back contact 1FC at 94 is closed).

A hall call in registration deenergizes hall call indication relay SS (not shown) to close back contact SS at 95 while a car call energizes relay CC (not shown) to close contact CC at 96. Further control of relays VR and CS is afforded by the contacts at 93. Door open control relay back contact OPS is closed when the door is at least partially closed. Stop between floor relay back contact SBF is closed except when the car is stopped between floors and out of the leveling zone. When so stopped the vernier control operates at slow speed to run the hoist motor at slow speed until the car reaches the next floor. The car runs normally from floors and back contact SBF is closed under these circumstances. If all safety circuits to run the car are in proper condition and the car is not on inspection service, the energization of relay LR energizes relay LR1 (not shown) to close contact LR1 at 93. Fifth step rheostat relay back contact RH5 is closed when the rheostat controlling the hoist motor is between its zero speed step and its fifth speed step. This contact insures that the vernier controlled normal start cannot be instituted if the car were stopped as under emergency conditions, while set for high speed operation.

The running and stopping controls for relays VR and CS have not been shown since they are conventional and are not modified to incorporate any of the special concepts of the emergency power operating mode. They run the car by maintaining VR and CS energized until the floor selector picks up a car or hall call or a stop signal is imposed by other means.

In operating in the emergency power mode according to this invention, the available auxiliary power is utilized to run a car or cars in an operation pattern utilizing up peak program features. Particularly where two or more cars are maintained in operation it is desirable to sustain the programming controls. As disclosed in the aforenoted Burky patent application programming and dispatching intervals are influenced by the integrated stop time of the cars in the system. In the emergency service mode of operation the cars are effective upon programming and dispatching only while they are capable of operation as the service car and only while they are effectively on a trip. Intermediate floor stopping relay MGF at 97 is energized only under these conditions to control the program and dispatch functions.

Relay MGF is disabled for any car not selected as a service car while the system is in the emergency power mode by the opening of back contact E1 at 97. In other respects the energizing circuits for relay MGF are enabled only when the car is not running or is load bypassing since either the generator field relays must be deenergized to close back contact UDX at 98 of the car running relay (not shown) or the back contact AMR at 97 of the deenergized advance motion relay must be closed as where the car is being brought to a stop at a floor or is stopped at the floor. Load bypassing closes contacts LBP at 99 to energize MGF and indicate intensive use of the elevator. A stopped car further must be operating in group service (contact GSC at 97 closed), be above the dispatching terminal (contact ADT at 97 closed), and be an active operating car (with non-assigned car relay back contact NAC at 97 closed) or not be bypassing (bypass relay back contact BP at 98 closed). When conditions are met for energizing MGF it indicates to computers that the car is subject to traffic in the form of transferring load represented by stop time of the car.

The circuits of FIG. 6 below line 99 are effective for each car only if the car is not on inspection service so that contact IN at 100 is closed in lead O. These circuits include car call controls for registering car calls from the control panel within the car as operated by passengers, car call stop initiating circuits effective as a car approaches a floor for which a car call is registered and car call cancelling circuits for cancelling such calls once the car is set to stop at the floor for which a call is registered. The car call controls are represented by the rectangle 177 labeled "car call circuits." These circuits are effective in the emergency power operating mode only while a car is selected as a service car and has its auxiliary emergency power relay deenergized to close back contact E1 at 101. Non-service cars each have their car call controls disabled by open back contacts E1 as at 101. The parallel combination of contacts DRC at 100, ACC at 102 and back contact RH5 at 101 reset the car call controls for each stop of the car at which a reversal in direction of travel occurs. Reset is accomplished by opening all parallel circuits simultaneously. Except at a reversal stop, the direction reversal control relay DRC remains energized. At a reversal stop it is deenergized to open contact DRC at 100. While the car is stopped and until it is set to be accelerated by the fifth rheostat relay, back contact RH5 is closed at 101 to provide a circuit for the car call controls. Car acceleration relay ACC (not shown) is energized when the car is accelerating and set to run at full speed so that contact ACC at 102 is closed at those times. When a car is approaching a floor at which it is to reverse, the determination to reverse is signified by the drop of relay DRC to open the contacts at 100 in the car call holding circuits. Contact ACC remains closed until deceleration is initiated. As the car slows for stopping at the floor, contact ACC opens. At this time back contact RH5 is open since the car has not been slowed below the fifth speed point, thus all circuits are open until the car slows to close back contact RH5 and the car call controls are reset.

By pass relay BP at 103, group service relay GSC at 104, load weighing relay LW at 105, and load by pass relay LBP at 107 are all subject to the independent service switch 178 for the car. This switch can be manually controlled and of limited access as by actuating it through a key in the car control panel. By pass relay BP is effective to cause a car to by pass hall calls when it is deenergized. In the emergency power operating mode it can be energized only while the car is selected as the service car so that its auxiliary emergency relay E1 is deenergized to close back contact E1 at 103. At all other times in the emergency power operating mode, contact E1 at 103 is open and the car bypasses. It will also bypass if failure timer FT (not shown) for the car times out to open contact FT at 103, the car is loaded to a level causing a load bypass and the opening of back contact LBP or an emergency stop condition is created to deenergize emergency stop relay EM (not shown) and open contact EM at 103.

Group service relay GSC as at 104 for each car is primarily responsive to the independent service switch 178. When it is dropped out the car is on independent service so that the car is not subject to dispatching or programming and does not respond to hall calls. Relay GSC is also dropped when the car's emergency stop relay EM is deenergized to open contact EM at 104.

Load weighing is enabled incidental to each stop after the long standing time has expired through the closure of back contact TRL at 105 of the long standing time relay TRL (not shown). It is accomplished by load weighing switch 179 which is of conventional form to close when greater than a predetermined load is in the car. With contacts TRL and 179 closed load weighing relay LW at 105 is energized. This relay actuates dispatching controls (not shown) to start a loaded car from a dispatch floor in advance of the expiration of the dispatch interval.

Load bypassing is set up by energization of load bypass relay LBP at 107 through the circuits for the load weighing relay LW while the door is closing. Door close control relay CLS (not shown) is energized to initiate door closing. It closes contact CLS at 106 which enables relay LBP until the door closely approaches the fully closed position. Door close limit relay DCL (not shown) closes contact DCL at 106 while the door is open, e.g. whenever the door is more than 2 inches from its fully closed position. Thus if the load is sufficient to close switch 179 as the car doors close and before the car starts to move relay LBP at 107 is energized and establishes a seal at contact LBP at 107. This seal maintains LBP energized until the next stop at which time back contact TRL at 105 is opened and the load again sensed.

Other modifications of the system which are not shown can be provided for the emergency power mode of operation through the use of contacts of the potential relay P as by front contacts where the functions are to be eliminated entirely or by back contacts where they are to be maintained throughout the operating mode; through the use of contacts of the emergency relay E of individual cars where those cars are to be modified in operation, such that back contacts open the circuits and front contacts close the circuits for the individual car throughout emergency power mode; and through the use of contacts of the auxiliary emergency relay E1 of the individual car when those circuits are to be effective only when the car is selected as a service car. For example, program control relays can be rendered ineffective during the emergency power operating mode by opening front contacts of relay P in the circuits for those relays. Individual cars having distinct service functions can be barred from those functions, during the emergency power operating mode by opening front contacts of their relay E in the circuits performing those functions.

Figure 7:
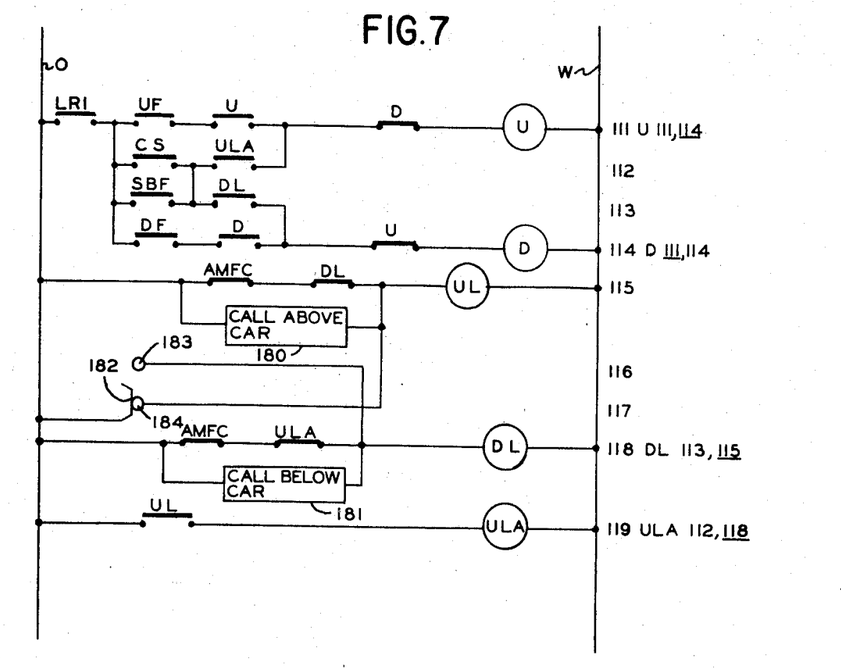
FIG. 7 is an across the line diagram of fragments of the car direction controls as modified for emergency power operation.

DESCRIPTION OF FIGURE 7

The individual car direction controls are abbreviated from the disclosure of the aforementioned De Lamater patent application. They comprise up and down direction starting relays U and D which enter into the energization control of the generator field relays UF and DF (not shown) to control the running direction of the car. Direction locking relays UL, DL and ULA, in turn, control relays U and D.

Much of the direction locking relay controls are incorporated herein by reference and represented only as rectangle 180 which completes a circuit to relay Ul for a call above the car and rectangle 181 which completes a circuit to relay DL for a call below the car. Circuits 180 and 181 are opened when no calls are imposed hence a car will part at the floor it last served when no further service is required. At such times above main floor control relay AMFC (not shown) is energized to open back contacts AMFC at 115 and 118 and deenergize relays UL and DL. When power failure occurs and the system operates on auxiliary power relays AMFC are denergized for the cars while relay BP at 103 is deenergized, as for a service car, and while a call is registered. In normal operation relays UL and DL are also controlled from the car's floor selector when it is at a terminal floor by engaging brush 182, carried by the floor selector crosshead, with a top floor contact segment 183 to energize DL for down travel and with a bottom floor contact segment 184 to energize UL for up travel.

A car selected to be shut down is set for down travel in the emergency power mode by energizing relay DL thereby locking out UL and ULA. Direction start relays can be energized only when the car's M-G set is running and the car is in a safe operating condition as indicated by closed emergency-normal relay LR1 at 111. A car started in its normal sequence by energization of relay CS to close contact CS at 112 energizes relay U at 111 when contact ULA at 112 is closed and energizes relay D at 114 when contact DL at 113 is closed. For a car stopped between floors the closure of contact SBF at 113 supplants the then ineffective contact CS at 112 to provide a circuit for U or D. When a direction starting relay is energized it locks out its counterpart by opening a back contact as D at 111 and seals itself through the appropriate generator field relay contact as at contacts D and DF at 114.

OPERATION OF THE SYSTEM

When the system is operating with normal power supplied between leads B42 and B43, potential relay P is energized through the emergency power transfer switch contact 150. Power loss for a significant interval, e.g. ½ second, causes relay P to drop out closing its back contacts at 12 and 61 to enable the emergency power mode controls of FIGS. 3, 4 and 5. When the system is transferred to an alternate power source, emergency power transfer switch contact 150 is opened and relay P remains deenergized and dropped out.

With the alternate power source connected as shown diagrammatically in FIG. 1 leads B42 and B43, YL and W, and O and W are energized with appropriate voltages. Contacts P at 12 and 61 connect this power to the respective circuits. Emergency relay E as at 13 and 15 for each car picks up immediately as does auxiliary emergency relay E1 as at 14 and 16 for each car. Opening of back contact E at 93 for each car opens the normal vernier and car starting and running circuits for relays VR and CS. Alternative starting and running circuits are provided for cars which are in group service and not at the first floor, so that contact GSC and back contact 1FC are closed, by auxiliaries emergency relay E1. Pick up of relay E1 for each car prevents the normal car operations. Open back contact E1 at 87 drops power failure relay PF so that it is energized only when the car is the selected emergency power car and has its contacts SEC at 86 closed. This prevents energization of the car's M-G set until it is selected. Each car's car call controls are disabled by open back contact E1 at 101. The car's are isolated from the system's program and dispatch computer, so far as stopping time is concerned, by opening back contact E1 at 97 in the circuit of intermediate floor stopping relay MGF. Deenergization of bypass relay BP at 103 by the opening of back contact E1 at 103 disconnects the car controls associated with the features of the aforenoted De Lamater patent application.

All cars set for group service, those having their inspection relay contact IN at 100 and their independent service switch 166 closed at 103, have their group service relays GSC at 104 energized. At this time the restored power has energized their emergency stop relays to close its contact EM at 103 provided safe running conditions prevail.

Restored power on the car controls energize each car's inspection relays IN and INA (not shown) and if the car is above the main or parking floor, the down direction locking relays DL at 118. Cars which are level with a floor at the time the alternate source of power is applied energize the leveling relays indicating their position as level. Those cars spaced from a floor will operate leveling relays to indicate that they are outside of the leveling zone and will therefore energize stop between floors relay SBF (none of which are shown).

The system first considers cars on independent service. These cars are cycled in sequence through an M-G set start, a start and run to the next lower floor at inspection speed, a stop at the floor with their door open, and either an M-G set shutdown, if switches 152 and 153 are so set, or a run to the main floor or parking floor, a door open interval, and an M-G set shutdown. The energization of car at floor relay CAF indicates a car is at a floor at which it is to shut down.

If car A were on independent service and stopped between floors when the alternate power source was imposed, its group service relay GSC at 104 would be deenergized since switch 178 is open. Closed back contact GSC-A at 41 coupled with closed back contacts 1FC-A (Car A not at the first or main floor) and CAF-A (Car A not yet shut down) would energize common group service relay GSX at 41. Back contacts of GSX in each car's car selection control relay CST circuit would be opened as at 45 and 47 so that only those cars not on group service having their back contacts GSC closed could have their CST relays energized. Each car not on group service, not selected as a service car and not at a floor energizes its CST relay through contacts GSC, SCS and CAF respectively as at 44 for car A. Relay CST enables the selection mechanisms for cars in independent service while group service cars are isolated therefrom.

With contact CST–A at 61 closed emergency car selection stepper ECS at 61 is energized and cocks its advance mechanism while closing contact ECS at 63 in the circuit to emergency car selection control relay ES at 64. Relay ES opens its back contact at 61 to deenergize ECS so that it steps successively closing for each step an individual ECS contact, one for each car, as represented at 66 and 67 for cars A and B. When the stepper closes its ECS contact for car A, selected emergency power car relay SEC–A is energized since in the assumed case contact CST–A is closed. This interrupts the stepper operation. Contact SEC–A at 64 is closed to detent stepper ECS by holding ES energized.

The power failure relay PF of car A at 87 is energized through contacts SEC at 86, switch 173, contacts RP and OL at 87 and coil PF. At this time all other cars have their energizing circuits for their PF relays open at their SEC contacts corresponding to that at 86 and their E1 contacts corresponding to that at 87. Contact SEC at 83 for car A closes in the starting circuits to cooperate with closed contact PF at 81 to energize M-G set start relay RE at 81. Starting switch timer LST is energized at the time power is applied to leads O and W to close its contact LST at 85. M-G set starting switch LS is energized at 85 through contact LST to close contact LS at 82 and open back contact LS at 82. M-G set start-run relay LSA is energized through contact LS at 82 to seal itself at 84 and initiate the dropout interval of LST by opening back contact LSA at 88. When LST drops the M-G set has had sufficient time to build up for transfer from a Y to a delta connection. LS is dropped to close back contact LS at 82 and M-G set run relay LR is energized to make the delta connection.

In the exemplary system the hoist motor control corresponds to that of United States patent application Ser. No. 343,301 filed Feb. 7, 1964, now Patent No. 3,410,367, in the names of Robert O. Bradley and Paul F. De Lamater for "Elevator Motor Acceleration Control by a Stepped Resistor Responsive to Distance from Floor" as modified in its direction locking controls according to those controls of Paul F. De Lamater United States patent application Ser. No. 565,551 filed July 15, 1966, for "Elevator Control." In the Bradley et al. application a hoist motor control is shown including a rheostat through which the fields of a generator are supplied. The rheostat is adjusted through a differential having inputs representing car motion and in one embodiment, the drive of a motor which advances the floor selector crosshead. The control is arranged to start a car by adjustments in the generator field circuit derived from car position as indicated by operation of hatchway leveling switches. It includes means to run a car at inspection speed from a stop between floors to a landing in the direction the car was traveling when it was stopped. The present system utilizes this stop-between-floor feature in response to a power failure followed by the application of power from an alternate source. Controls are arranged in the present system to release the direction locking when power is removed as in the De Lamater application. Power from the alternate source, under these circumstances energizes the down direction relay to set the car for down travel.

In FIG. 7 up and down direction start relays U and D are responsive to auxiliary up direction relay ULA and down direction relay DL. The circuits of up and down direction relays UL and DL are abbreviated to disclose only the functions of interest for the emergency power mode of operation and the reversal means afforded by floor selector brush 182 to engage contact 183 when the car is at its upper limit and 184 when it is at its lower limit. In the above noted De Lamater application it is disclosed that the cars can park with both direction relays dropped when no call is registered requiring their service and that the cars will establish a direction according to the spatial relationship of a call to which they respond to the current car position. The circuits providing these functions are in parallel with contacts AMFC at 115 and 118 for the above main floor relay AMFC (not shown). When power to the system is interrupted and then power from an alternate source is imposed each car's bypass relay BP is deenergized by open auxiliary emergency relay back contact E1 at 103. Relay BP deenergizes relay AMFC (by means not shown) hence the direction relays are each connected across leads O and W and are energized when the alternate power is imposed. The direction relays are interlocked with an auxiliary up direction relay ULA at 119 providing one relay operating interval delay of interlocking back contact ULA at 118 relative to back contact DL at 115. Thus back contact DL at 115 opens to drop UL before UL closes its contact at 119 and pulls in ULA. In this manner a power failure insures that each car not at the main floor will be set for down travel.

Down direction start relay D at 114 is energized for each car to cause it to run in the down direction when the car's emergency normal relay contact LR1 at 111 is closed and either its car start relay contact CS at 112 for a car at a floor or its stop between floor relay contact SBF at 113 is closed, provided contact DL at 113 is closed. Once the down direction start relay is energized, it sets the down generator field relay (not shown) to start the car and seals itself through contact D at 114 and down generator field relay contact DF at 114. Relay D is interlocked with relay U through back contacts D at 111 and U at 114 respectively. It is held until the car is stopped and contact DF at 114 opened by the usual controls.

With car A stopped between floors and in a safe operating condition stop between floors relay SBF is energized by a combination of closed contacts of door close limit relay DCL, main switch M and four inch leveling zone relay L4 (not shown). Open back contact SBF at 93 prevents energization of venier start and run relay VR and car start and run relay CS and other SBF contacts disable the controls which advance the crosshead of the car's floor selector. This permits the car to descend by the intermittent operation of the floor selector advance motor from the rheostat cams such that the advance motor runs until the rheostat is set for low speed operation of the hoist motor. As the hoist motor responds it drives the rheostat through the differential having the hoist motor and advance motor inputs, to cause the rheostat to be displaced toward a higher speed and to actuate the advance motor controlling contacts. Thus the car travels at slow speed toward the next lower floor by intermittently and momentarily actuating the advance motor as described in detail in the aforenoted Bradley et al. patent application. When the car is at the point in the leveling zone of the next lower floor where its 4 inch leveling zone relay L4 is dropped out, relay SBF is deenergized and the car levels into the floor under control of its leveling switches.

As the car levels to the floor its doors are opened conventionally, it is stopped and its brake is set. Two alternate conclusions of the sequence of parking and shutting down an "independent service" car when it is level with a floor and its doors are opened are available. A first sequence effective when switch 152 in the CLT circuit is closed and switch 153 in the VR and CS circuit is open causes the car to shut down at the floor with which it is initially level. Under these conditions as the car levels to within four inches of the floor and drops contact L4 at 29 a circuit is completed for timer CLT through contacts FC, SEC, GSC and L4. The car starting circuits for VR and CS between leads 174 and 175 are open due to open contact GSC at 94, hence the car cannot start from the floor while CLT times out. When CLT times out the car is shut down through energization of relay CAF.

The second sequence is effective when switch 152 is open and switch 153 is closed. The approach of the car to within four inches of the floor has no effect on CLT since open contact 1FC at 29 and open switch 152 prevent energization of timer CLT until the car reaches the main floor and contact 1FC is closed. The stop of the car at the floor above the main floor results in a normal stop cycle since closed switch 153 provides an energizing path for VR and CS around open contact GSC at 94. As the car levels into the main floor, the closing of contact L4 at 29 initiates the interval of timer CLT. At this time back contact 1FC at 94 is open to interrupt the circuit for VR and CS and prevent restarting of the car.

When the car is conditioned to take off from the floor, it starts downward when its standing time interval at the floor has expired and back contact TR at 92 closes. It is incapable of receiving car calls since its car call circuits are disabled by open back contact E1 at 101. It responds to no hall calls since bypass relay BP is deenergized by open back contact E1 at 103. Since the car restarts from a position level with a floor the SBF relay is deenergized and the start is in the normal manner for a car at a floor and set for down travel. Relays VR and CS are energized as the car doors are closed to close back contact OPS at 93. Standing time has expired for the car to close back contact TR at 92 so that the circuit is provided through back contacts HS, MG, ADT, TR and AIN and front contact DRC at 92 to lead 174 through switch 153, back contact 1FC and contact E1 to lead 175, and through back contacts OPS, SBF and RH5 and front contact LR1 all at 93 to coils VR and CS. After the car is started through VR and CS it continues to run at normal speed until slowdown is initiated by the deenergization of VR and CS by the car stopping controls 185.

Shut down of the car and release of the interlocked emergency power controls by energization of the car's car at floor relay CAF to deenergize the car's car selection control relay CST and thus its selected emergency car relay SEC follows the same pattern for each car whether it be on independent service or group service. Car A will be considered following energization of relay CAF-A at 19. Contact CAF-A at 21 seals CAF-A for the remainder of the emergency power operation unless a reselection cycle is required to select an operative final car. Opening of back contacts CAF-A at 41, 44 and 73 respectively eliminate car A's energizing path for common group service relay GSX, deenergize car selection control relay CST-A at 44, and open car A's energizing path for final car relay FC at 73.

The drop of relay CST-A at 44 opens contact CST-A at 61 to remove car A's energizing path for stepper coil ECS of the emergency car selector and drops SEC-A at 66 by opening contact CST-A at 66. Car A ceases to be the selected emergency car upon the drop of SEC-A. Contact SEC for car A at 86 opens to disable the car's power failure relay PF at 87 whereby its M-G set is shutdown by opening contact PF at 81 and deenergizing relays RE at 81, LR at 82 and LSA at 84. The opening of SEC-A contacts at 29, 69 and 83 has no effect at this time. Opening of contact SEC-A at 64 actuates the emergency car selector ECS by releasing latching relay ES.

Open contact SEC-A at 64 deenergizes control relay ES. The drop of ES is delayed by resistance 186 and capacitance 187 across its coil. While car A was selected stepper coil ECS was held deenergized by open back contact ES at 61. If another car has its car selection control relay CST energized as car B through CST-B at 46, an energizing circuit will be available for coil ECS through contact CST-B at 62 when the dropout interval of ES expires and back contact ES at 61 closes. Upon energization of ECS it cocks its stepping mechanism and closes contact ECS at 63 to energize relay ES at 64. This opens back contact ES at 61 to drop ECS and permit its stepping mechanism to advance. The advance closes the ECS stepper contact in the energizing circuit of the selected emergency power car relay SEC of the next car, SEC-B at 67 in the example. If the car's selection control relay is energized, as assumed, contact CST-B at 67 is closed and the circuit for relay SEC-B at 67 is complete to pull that relay in. Contact SEC-B at 65 is thus closed to reenergize control relay ES at 64 before that relay's dropout interval expires. This holds back contact ES at 61 open and prevents further advance while car B remains selected.

As for car A, car B's SEC relay conditions the car's car leveling timer CLT-B for energization at 32, conditions its service car relay SCS-B for energization at 71 and starts its M-G set through power failure relay PF at 87 and the M-G set start and run relays RE at 81, LS at 85, LSA at 84, and LR at 82. Relay CLT is not energized for an independent service car until it is within four inches of level with the next lower floor at which time it sets the interval allotted the car to level into floor open its doors and shut down its M-G set. If car B were an "independent service" car stopped at a floor at the time the power failed, timer CLT would be energized as it was selected and if switch 152 was closed and 153 open the M-G set would shutdown at the end of the CLT interval without moving the car. For a group service car CLT is not energized until the car is within four inches of the main floor. Relay SCS is energized only for the final car selected in the emergency power selection sequence.

For illustration purposes first assume that car B is on independent service, that no other car is on independent service, and that car B is stopped within four inches of a floor. Relay GSX will be maintained energized until car B energizes its car at floor relay to open back contact CAF-B at 42 or until it is at the first floor to open back contact 1FC-B. Open back contacts GSX prevent energization of all car selection control relays of cars which are in group service. Since car B is on independent service CST-B at 46 is energized through back contacts GSC-B, SCS-B and CAF-B all at 46. This enters into the locking of selector ECS on car B as described to energize SEC-B.

As a second illustration assume car B is in group service and another car, car C or D, is on independent service such that either car C or D provides a circuit for relay GSX from lead B44 to arrowheaded lead 165. Open back contact GSX at 47 in conjunction with open back contact GSC-B at 46, for group service car B, prevents energization of relay CST-B at this time. However it is assumed that car C or D has a CST relay (not shown) energized to close a circuit between lead YL and arrowheaded lead 167 in the circuit of stepper coil ECS. Since contact CST-B at 67 is assumed to be open, SEC-B will not be energized on the first step of stepper ECS. Hence no hold circuit is provided for control relay ES. With the energization of ECS contact ECS at 63 energizes ES to deenergize ECS and open contact ECS at 63. Coil ES is energized only briefly and then initiates its dropout interval while ECS is conditioned to select car B. When car B is not selected prior to the expiration of the interval, ES drops to close back contact ES at 61 and reenergize ECS. This cocks the stepper and energizes control ES to cause another step of advance to the selection circuits for car C (not shown). If car C has its CST relay energized, it energizes its SEC relay (not shown) to provide a hold circuit for control ES between lead YL and arrowheaded lead 175. The energized SEC relay then starts the car's M-G set, insures that it is level to a floor, initiates its car leveling timer interval, opens the car doors and at the end of the interval energizes the car's car at floor relay CAF to shut down the car and permit selection of another car.

When all "independent service" cars have been selected and shut down the common group service relay GSX is deenergized to close back contacts as at 45 and 47 in the car selection control relay CST circuits for the "group service" cars. If car B were in "group service," its switch 166 at 103 would energize its GSC relay at 104 thereby opening its back contact GSC-B at 42 to disable the GSX energizing circuit by car B. Open back contact GSC-B at 46 restricts energization of car selection control relay CST-B to the control of relay GSX. Closed contacts GSC-B at 73 and 74 enter into the final car logic to be discussed. Contact GSC for car B at 82 enters into the M-G set starting function for the car for normal power operation. Contact GSC at 94 insures the start and run of a "group service" car to the main floor on emergency power operation. Contact GSC at 97 is effective for the final car, if it is in group service, to enable intermediate floor stopping relay MGF to function in the program and dispatch computers for the car remaining in service on emergency power operation.

With CST-B energized and stepper ECS at the car B position relay SEC-B at 67 is energized as previously discussed to start the car's M-G set, partially enable car leveling timer CLT-B at 32, lock the selector on car B, and partially enable the service car relay SCS-B at 71. If car B, as a group service car, is stopped between floors when selected, it will have its M-G set started, run at low speed to the next lower floor, level into the floor, open its doors for a normal door open interval, close its doors, run down to the main floor, open its doors, and, at the end of its car leveling timer interval, shut down its M-G set.

Down direction is set for car B as described for FIG. 7 as power is restored from the alternate source. Relay SEC-B starts the M-G set for car B as described. The stop between floor relay is energized for car B under the assumed conditions to open back contact SBF at 93 and cause the car to run at slow speed to the next lower floor as described. When the car is four inches above the floor, relay SBF is deenergized and the car is leveled on the leveling switches. The car doors are opened automatically by conventional controls while the car is leveling and the normal door controls hold the door open for a regular stop interval and then by the closure of back contact TR at 92 the door closing is initiated and when completed the car's vernier start and run relay VR at 93 and car start and run relay CS at 95 are energized through contact GSC of the group service relay, back contact 1FC of the main floor relay and contact E1 of the auxiliary emergency relay all at 94.

A stop of a group service car at other than the main floor has no effect on the car leveling timer. In the case of car B back contact GSC-B at 33 is open and since the car is not at the main floor contact 1FC-B is open so that no circuit is available to energize CLT-B at 32. After car B's door open interval expires at an intermediate floor the car runs from the floor at normal speeds and since the car call circuits and hall call circuits are ineffective due to open E1 back contacts at 101 and 103 it travels to the main floor. As the car approaches the main floor it is slowed by conventional controls and stopped level with the floor while its doors are opened by normal controls. It energizes car leveling timer CLT-B at 32 when four inches above the floor by closing back contact L4-B at 32 of the four inch leveling zone relay. At this time contact 1FC-B at 32 is closed since the car is in the leveling zone of the main floor. With CLT-B energized the shutdown interval is initiated. During the interval of CLT-B the car completes its leveling and opens its doors to permit passengers to leave the car. At the end of the interval CLT-B closes its contact at 26 to energize car at floor relay CAF-B at 25 through contacts RFT at 17, RE-B at 26 and CLT-B at 26. CAF-B seals itself at 27 and drops CST-B at 46 whereby SEC-B at 67 is dropped to shut down the M-G set of car B by PF at 87 and RE at 81, LSA at 84 and LR at 82.

Stepper ECS is enabled to advance by the drop of SEC-B at 65 provided a car remains to be selected and has its CST relay energized. Next assume that car B is in group service, and is stopped at a floor. Any group service car stopped at a floor, when selected by ECS starts its M-G set, and if not the final car runs directly to the main floor, opens its doors and shuts down its M-G set. If it is the final car its starts the M-G set and runs to serve hall and car calls. Operation of relay SEC-B starts the M-G set so that the car opens its doors and starts the door interval timer. When the door interval expires, closure of back contact TR at 92 enables relays VR and CS through contacts GSC, 1FC and E1 at 94. As the car approaches within four inches of the main floor timer CLT-B at 32 is energized to establish the shutdown interval and through CAF-B at 25 shut the car down.

The emergency power mode is arranged to select independent service cars before group service cars so that the last car of cars selected ordinarily will be set for group service and can be operated subject to the system controls to provide a limited amount of service up to the capacity of the power available. The illustrated system contemplates but one car in service after the remaining cars have been shut down. Such car is maintained for service by the drop of final car relay FC at 73.

When relay P dropped and the alternate power source was applied, if two cars were in group service relay FC at 73 was energized. Relay FC is responsive to the condition that two or more cars are in group service and neither has picked up its CAF relay. For example if cars B, C and D are in group service so that relay GSC-B, GSC-C and GSC-D are all energized and the selector ECS is set to select cars in the sequence A, B, C and D, relay FC is held energized while cars A, B and C sequenced and drops as car C initiates its shutdown by energization of relay CAF-C. Each car partially enables at least one half of an energizing circuit for relay FC when it is in group service and has not energized its car at floor relay CAF. The circuit for relay FC is polarized by rectifiers 170 such that all but the last car in the sequence has a circuit to the left of the rectifiers and all but the first car in the sequence has a circuit to the right of the rectifiers. In this manner any combination of cars in circuit enabling condition will energize relay FC. Thus if only cars A and D were in group service FC would have an energizing path from lead YL through contacts GSC-A and CAF-A at 73, rectifiers 170 and contacts CAF-D and GSC-D at 75.

With car A shut down back contact CAF-A at 73 is open and either car B or C must be in group service and not at a parking floor to energize FC. When only two cars remain to be parked, as cars C and D, back contacts CAF-A and CAF-B are open so that the energization of car at floor relay CAF-C opens back contact CAF-C at 75 to deenergize FC. With FC dropped the circuits of the car leveling timers are disabled by opening contact FC at 29. Back contact FC at 35 closes to enable recycle failure timer RFT at 35. Back contact FC at 69 closes to enable the selected emergency power car relays SEC to pick the service car relays. The selector ECS is operated in the car selection sequence described above when the next to the last car energized its CAF relay. Thus, when SEC-D picks, it energizes SCS-D (not shown but connected to the arrowheaded lead 169) which seals itself through an EX-D contact as at 70.

Service car relay SCS sets the car for service in response to car and hall calls by opening its back contact to drop the car's auxiliary emergency relay E1 as at 16. This closes back contacts E1 at 101 in the car call circuits and E1 at 103 in the bypass relay circuit of the car. Relay SCS removes the car from the selection sequence by opening back contact SCS in the energizing circuit for car selection control relay CST as at 46 and by opening contact CST in the selected emergency power car relay SEC as at 67. The drop of SEC at this time has no effect on SCS due to the seal circuit as at 68.

The final car has its M-G set started by the closing of back contact E1 at 87 to energize relay PF and by the closing of contact SCS at 84 to cooperate with contact PF at 81 in energizing relays RE at 81, LS at 85, LSA at 84, and LR at 82. Its emergency power operation, car starting circuit is open at this time by open contact E1 at 94 to avoid running the car automatically to a parking floor. The car's operations become effective in the program and dispatch computer through the enabling of the intermediate floor stopping relay MGF at 97 by the closing of back contact E1 at 97. If the car is stopped at a floor it runs in response to the expiration of its door time, provided when back contact TR at 92 closes, a car call is registered to close car call relay contact CC at 96 or a hall call is registered to close landing call indication relay back contact SS at 95, to energize relays VR at 93 and CS at 94 the car runs in the direction dictated by the calls imposed on it by energizing relay UL for a call for a floor above the car or relay DL for a call below the car, as described in detail in the above mentioned De Lamater patent application. If the car is stopped between floors, its relay SBF will pick up to bring the car to the nearest lower floor as described above. The car will level to the floor, open its doors, stand for its door time and at the end of the door time the closing of back contact TR at 92 will permit energization of relays VR and CS to run the car provided a car or hall call is registered to close either contact CC at 96 or back contact SS at 95.

Provision is made to avoid lock up of the emergency power operating mode when a car fails. If during a starting sequence a car fails to start, its M-G set the stepper ECS is released after a suitable interval and advances to the next car. If the final car fails to provide service the selection sequence is recycled. In the second instance a failed car, once removed from the emergency power operating mode, remains out of operation for the remainder of the period that mode continues.

Both "group service" and "independent service" cars can fail to start their M-G sets. If car A as a car on "group service" failed to start its set when it was selected by ECS while relay FC is energized to indicate cars remain to be selected, its emergency failure timer EFT-A at 31 times out. The energizing circuit for EFT-A through contact FC at 29 is completed by the closure of contact SEC-A at 29 when the car is selected and is opened by the energization of partial brake relay (not shown) to open back contact PBK-A at 31 in normal operation before the interval required to operate timer EFT-A has expired, e.g. one minute. Thus if the car has its generator field relay energized, as it will preparatory to running, within one minute of the time it is selected, timer EFT-A is ineffective and is reset by the opening of back contact PBK-A. If relay EFT-A times out, it closes its contact at 19 to energize CAF-A thereby latching CAF-A at 21 to condition the circuits of car A to indicate the emergency power operation of the car is completed. The selection cycle is thereby released through the drop of CST-A and ECS advances to the next car.

The possibility remains that the final car in the selection sequence will either fail to start or after running fails. Under these circumstances the final car relay FC is out and SCS as at 69 for car A is in. Vernier-inspection normal relay INV- (not shown) located behind the usual elevator safety switches, contacts of the M-G set start and run relays and the motor field protection relay such that relay INV remains deenergized and its back contact INV-A for car A at 35 remains closed if the car is incapable of running. Recycle failure timer RFT at 35 must be energized for a substantial interval e.g. three minutes, to time out and operate its back contact at 17 and front contact at 49. It is energized when the final car, indicated by closed back contact FC at 35, is selected as the service car, indicated by closed contact SCS-A for car A at 35, and that car is incapable of running, indicated by closed back contact INV-A at 35. Ordinarily relay INV is energized when the motor-generator set is up to speed and back contact INV at 35 is opened long prior to the expiration of the interval of RFT.

If the service car fails to energize its INV relay within the interval of RFT, the opening of back contact RFT at 17 deenergizes all of the car at floor relays of those cars which have been parked. This restores the system to the initial condition of the emergency power mode. Contact RFT at 49 is closed to provide a seal for car failure relay EX-A at 49 for car A through contact SCS-A where car A is currently the service car. Relay EX-A seals itself at 48 and drops the service car relay SCS-A by opening back contact EX-A at 68. Contact EX-A at 17 is closed so that upon the drop of RFT and the closure of back contact RFT at 17 as contact SCS-A at 35 opens relay CAF-A will be energized. Car A will therefore be skipped in the selection process since its CST-A relay cannot be energized and it is effectively out of the system for the systems selection cycle.

Since all CAF relays were dropped by RFT the sequences revert to the original state and proceed as described. Independent service cars are selected and parked first, then group service cars are selected and parked, except the failed car is no longer included. If car A was the failed car and the sequence of selection by ECS was B, C, D and A, the next cycle would drop FC when car D was to be selected and car D would become the service car.

In recapitulation of the invention it is to be noted that if applies to a multicar system which is provided with a secondary source of power, as source 148, which is auxiliary to a primary source of power, as source 143. The secondary source has insufficient capacity to run all cars simultaneously. However, when applied to the system by emergency power transfer switch 149 it is of sufficient capacity to operate less than all of the cars, as one car in the detailed example, or two cars for a system of four or more cars. The system is arranged to park each of a plurality of cars at floors with their M-G sets shut down and then to continue service to the capacity of the secondary power source by offering general service by one or more cars. A selection means 151 as emergency car selector ECS is activated by the transfer to the secondary source to select cars for operation to a suitable shutdown condition. A preference is established for the selector to select cars on "independent service" in advance of those on group service.

The system has a group supervisory control, as control 129, to which each car is responsive when its independent service switch 178 is closed to maintain it on group service through relay GSC. When a car's GSC relay is deactivated to place the car on "independent service" its selection control relay CST enables selector 151 even though the common group service relay GSX disables the selection control relays of those cars on group service. Relay GSX remains effective in this fashion until all independent service cars have been shut down.

Selection of a car activates means to couple secondary source of power to the energizing means for its hoist motor 128 by operation of relay SEC to cause the starting of the cars M-G set 142. Application of power to the cars' controls sets it for down travel through down direction locking relay DL. Cars stopped outside the leveling zone for a floor operate their SBF relay to cause them to run at slow speed to a floor. When a car is within the leveling zone for a floor it can have a shut down cycle initiated if it is on "independent service." Timer CLT begins its interval as the car enters the leveling zone or if initially in that zone, as it is selected. When CLT times out it actuates means to decouple the secondary source of power from the car by energizing the cars' CAF relay. Relay CAF is sealed thereafter to lockout selection of the car by the selecting means 151 and the selecting means is enabled to hunt for other cars to be processed by the drop of the shut down cars' SEC relay.

After the "independent service" cars have been shut down "group service" cars are sent to the main floor and are shut down.

Car count means such as final car relay FC are activated when the number of cars having activated group service controls which have not been selected by the selecting means equals the number of cars to be maintained in operation is effective to alter the system functions. Thus when the requisite cars have been shut down the car count means inhibits the means decoupling the secondary source from the remaining car or cars through service car relay SCS and deenergized auxiliary emergency relay E1.

During the initial car selections the car call registering means 177 is subject to car call lockout means back contacts E1 at 101 for rendering selected cars non responsive to the car call means even though they run. When the car count means activates relay SCS it inhibits the car call lockout means. Similarly, hall call means 140 are subject to lockout means, bypass relay BP operated by opening back contact E1 at 103 and relay E1 closes that back contact to inhibit the lockout function in response to activation of the car count means.

The group control includes means for altering operation of the system in accordance with changes in traffic conditions through operation of relay MGF. Back contact E1 at 97 constitutes means to inhibit the altering means MGF in response to the application of power to the system from the secondary source. When the car count means is activated the inhibiting means back, contact E1 at 97, is inhibited by deenergization of relay E1 to close the contact.

Lockup of the system by a car failure is overcome to insure service when the shut down of the initially selected cars has been completed. When the service car means, relay SCS, for each "group service" car which is not to be shut down responds upon activation of the car count means FC, failure timer means RFT is activated upon failure of a car having a responsive service car means to run for a given interval. RFT inhibits the selection lockout means CAF for previously selected cars and recycles the selecting means 151. It also energizes the failed cars EX relay as a means to bypass selection by said selection means 151 of a car for which said failure timer means has been activated.

Failure of a car can also lockup the selector 151. A failure timer means EFT activated upon failure of a selected car to respond to selection by said selecting means within a given interval activates means to release said car from selection, CAF. With the failed car's CAF relay energized the selection means bypasses selection of the failed car.

Thus in ordinary operation the final cars selected are operative "group service" cars which can provide general service in response to the car and hall call means. If a failure of a car occurs, the selection process is permitted to advance and find another car.

In view of the many types of elevator controls available to which the present system can be applied, and in view of the variations of features which can be utilized with utility, it is to be understood that this invention lends itself to modification. Accordingly, it is to be understood that the present description is merely illustrative of the inventive features and is not to be read in a limiting sense.

The embodiments of the invention in which an exclusive property or privilege is claimed are defined as follows:

1. An elevator system having a plurality of cars serving a plurality of floors including a main floor; a primary source of power for operating said system; a secondary source of power having a capacity to operate only a portion of the cars of said system; a group supervisory control for coordinating the operation of said cars; a group service control for each of a plurality of said cars to couple, when activated, said car to said group supervisory control; means for at least one car to operate said car independently of said group supervisory control when said group service control for said car is deactivated; means to transfer the system between said primary source of power and said secondary source of power; means operative while said system is subject only to said secondary source of power for selecting a restricted number of cars for operation, said number being within the capacity of said secondary source of power; and means to cause said selecting means to select an operative car having its group service control deactivated in preference to a car having its group service control activated.

2. An elevator system according to claim 1 including a hoist motor for each car, an energizing means for each hoist motor, and means to couple said secondary source of power to said energizing means of a car selected by said selecting means.

3. A combination according to claim 2 including means to decouple said secondary source of power from a car in response to the presence of said car within a leveling zone for a floor.

4. A combination according to claim 3 including means to lockout selection by said selecting means of a car for which said decoupling means has operated.

5. A combination according to claim 3 including means to enable hunting by said selecting means upon release of said selected car.

6. A combination according to claim 5 including car count means activated when the number of cars having activated group service controls which have not been selected by said selecting means equals the number of cars to be maintained in operation and said selecting means has selected all other operative cars in said system; and means to inhibit said decoupling means in response to activation of said car count means.

7. A combination according to claim 6 including means for registering car calls for each car; car call lockout means for rendering selected cars non responsive to said car call means; and means to inhibit said car call lockout means in response to activation of said car count means.

8. A combination according to claim 6 including means for registering hall calls for said system; hall call lockout means for rendering selected cars non responsive to said hall call means; and means to inhibit said hall call lockout means in response to activation of said car count means.

9. A combination according to claim 6 including means for altering operation of said system in accordance with changes in traffic conditions imposed on said system; first means to inhibit said altering means in response to the application of power to said system from said secondary source; and means to inhibit said first means to inhibit in response to activation of said car count means.

10. A combination according to claim 6 including means to lockout selection by said selecting means of a car for which said decoupling means has operated; service car means for each car having activated group service controls and which has not been shut down by said decoupling means; failure timer means activated upon failure of a car having a responsive service car means to run for a given interval to inhibit said selection lockout means and to recycle said selecting means.

11. A combination according to claim 10 including means to bypass selection by said selecting means of a car for which said failure timer means has been activated.

12. An elevator system according to claim 2 including failure timer means activated upon failure of a selected car to respond to selection by said selecting means within a given interval; and means to release said car from selection in response to activation of said failure timer.

13. An elevator system according to claim 12 including means to bypass selection of a car by said selection means in response to activation of said failure timer.

14. An elevator system according to claim 2 including level sensing means for each car which is activated when said car is in a leveling for a floor; a timer for defining time interval a selected car has its level sensing means activated; and means responsive to the expiration of said time interval to decouple said coupled secondary source of power from said energizing means of said selected car.

15. An elevator system according to claim 14 including means responsive upon operation of said decoupling means to actuate said selecting means to select another car; and means to bar selection by said selecting means of a car for which said decoupling means has operated, whereby each of a plurality of cars is selected in sequence and when level with a floor is shut down.

16. An elevator system according to claim 2 including, level sensing means for each car activated in response to the positioning of said car within a leveling zone for a floor; means responsive to the application of said secondary source of power to said system to set a car for travel downward; means effective upon selection of a car to move at a low speed, said selected car having its level sensing means deactivated to indicate said car is located outside a leveling zone for a floor; means to stop said car automatically at the first floor at which said level sensing means is activated; and means to decouple said coupled secondary source of power from said energizing means of said selected car in response to the activation of said level sensing means.

17. An elevator system according to claim 16 including a timer for defining a time interval a selected car has its level sensing means activated; and means effective during said time interval to inhibit said decoupling means and effective upon expiration of said time interval to enable said decoupling means.

18. An elevator system according to claim 2 including means responsive to the application of power to said system from said secondary source to set a car for travel downward; means responsive to the selection of a car by said selecting means to start said selected car downward; and means to stop said started car at said main floor.

19. An elevator system according to claim 18 including level sensing means for each car which is activated when said car is in a leveling zone for said main floor; a timer for defining a time interval a selected car has its level sensing means activated while in the leveling zone for said main floor; and means responsive to the expiration of said time interval to decouple said coupled secondary source of power from said energizing means of said selected car.

20. A combination according to claim 19 including means to release said selecting means from said selected car in response to the expiration of said time interval.

21. A combination according to claim 20 including means to enable hunting by said selecting means upon release of said selected car.

22. A combination according to claim 16 including means to inhibit said decoupling means while said selected car is spaced from said leveling zone of said main floor.

23. A combination according to claim 2 including means for registering car calls, means for registering hall calls, means for rendering cars non responsive to said car call and hall call means in response to the application of power for said system from said secondary source.

24. A combination according to claim 2 including means for altering operation of said system in accordance with changes in traffic conditions imposed on said system, and means to inhibit said altering means in response to the application of power to said system from said secondary source.

References Cited

UNITED STATES PATENTS 2,968,364   1/1961   Robertson _________ 187—29

ORIS L. RADER, Primary Examiner

W. E. DUNCANSON, JR., Assistant Examiner